United States Patent
Cui et al.

(10) Patent No.: US 8,877,374 B2
(45) Date of Patent: *Nov. 4, 2014

(54) NANOWIRE BATTERY METHODS AND ARRANGEMENTS

(75) Inventors: Yi Cui, Sunnyvale, CA (US); Candace K. Chan, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/895,424

(22) Filed: Sep. 30, 2010

(65) Prior Publication Data

US 2011/0020713 A1    Jan. 27, 2011

Related U.S. Application Data

(63) Continuation of application No. 11/837,291, filed on Aug. 10, 2007, now Pat. No. 7,816,031.

(51) Int. Cl.
| | | |
|---|---|---|
| H01M 4/02 | (2006.01) | |
| H01M 4/13 | (2010.01) | |
| H01M 4/1395 | (2010.01) | |
| H01M 4/66 | (2006.01) | |
| H01M 4/75 | (2006.01) | |
| H01M 4/134 | (2010.01) | |
| H01M 10/052 | (2010.01) | |
| H01M 4/04 | (2006.01) | |

(52) U.S. Cl.
CPC .......... *H01M 10/052* (2013.01); *H01M 4/1395* (2013.01); *H01M 4/661* (2013.01); *Y02T 10/7011* (2013.01); *Y02E 60/122* (2013.01); *H01M 4/75* (2013.01); *H01M 4/134* (2013.01); *H01M 4/0421* (2013.01)
USPC ...................................... 429/209; 429/218.1

(58) Field of Classification Search
None
See application file for complete search history.

(56) References Cited

U.S. PATENT DOCUMENTS

| | | | |
|---|---|---|---|
| 4,436,796 A | 3/1984 | Huggins et al. | |
| 5,457,343 A | 10/1995 | Ajayan et al. | |
| 5,997,832 A | 12/1999 | Lieber et al. | |
| 6,334,939 B1 | 1/2002 | Zhou et al. | |
| 6,423,453 B1 | 7/2002 | Noda | |

(Continued)

FOREIGN PATENT DOCUMENTS

| | | |
|---|---|---|
| CN | 1909265 A | 2/2007 |
| EP | 2191526 | 6/2012 |

(Continued)

OTHER PUBLICATIONS

Ying et al. "Characterization of SnO2 nanowires as anode materials for Li-ion batteries." Applied Physics Letters 87(11), 2005 (Abstract only).

(Continued)

*Primary Examiner* — Barbara Gilliam
*Assistant Examiner* — Adam A Arciero
(74) *Attorney, Agent, or Firm* — Crawford Maunu PLLC

(57) ABSTRACT

A variety of methods and apparatus are implemented in connection with a battery. According to one such arrangement, an apparatus is provided for use in a battery in which ions are moved. The apparatus comprises a substrate and a plurality of growth-rooted nanowires. The growth-rooted nanowires extend from the substrate to interact with the ions.

54 Claims, 5 Drawing Sheets

(56) References Cited

U.S. PATENT DOCUMENTS

| | | | |
|---|---|---|---|
| 6,465,132 | B1 | 10/2002 | Jin |
| 6,514,395 | B2* | 2/2003 | Zhou et al. .................. 204/409 |
| 7,323,218 | B2 | 1/2008 | Chen et al. |
| 7,402,829 | B2 | 7/2008 | Green |
| 7,408,829 | B2 | 8/2008 | Kuang et al. |
| 7,683,359 | B2 | 3/2010 | Green |
| 2003/0089899 | A1 | 5/2003 | Lieber et al. |
| 2003/0203139 | A1 | 10/2003 | Ren et al. |
| 2004/0126659 | A1 | 7/2004 | Graetz et al. |
| 2005/0238810 | A1* | 10/2005 | Scaringe et al. ........... 427/249.1 |
| 2005/0279274 | A1 | 12/2005 | Niu et al. |
| 2006/0097691 | A1 | 5/2006 | Green |
| 2006/0154141 | A1* | 7/2006 | Salot et al. .................... 429/149 |
| 2006/0216603 | A1 | 9/2006 | Choi |
| 2007/0031733 | A1 | 2/2007 | Kogetsu et al. |
| 2008/0008844 | A1 | 1/2008 | Bettge et al. |
| 2008/0044732 | A1 | 2/2008 | Salot et al. |
| 2008/0280169 | A1 | 11/2008 | Niu et al. |
| 2008/0280207 | A1 | 11/2008 | Patoux et al. |
| 2009/0316335 | A1 | 12/2009 | Simon et al. |
| 2010/0221596 | A1 | 9/2010 | Huggins et al. |

FOREIGN PATENT DOCUMENTS

| | | |
|---|---|---|
| JP | 2004-281317 A | 10/2004 |
| JP | 2005-011725 A | 1/2005 |
| JP | 2005-196970 A | 7/2005 |
| JP | 2005259637 | 9/2005 |
| WO | WO 2005/076389 | 8/2005 |
| WO | WO 2007/083152 | 7/2007 |
| WO | WO 2007/083155 | 7/2007 |
| WO | WO 2008/139157 | 11/2008 |
| WO | WO 2009/010757 | 1/2009 |
| WO | WO 2009/010758 | 1/2009 |
| WO | WO 2009/010759 | 1/2009 |

OTHER PUBLICATIONS

A.M. Morales and C.M. Lieber. "A Laser Ablation Method for the Synthesis of Crystalline Semiconductor Nanowires." Science 279, p. 208-211, 1998.

Chan, C.K., et al, "High Capacity Li Ion Battery Anodes Using Ge Nanowires," Nano Letters, vol. 8, No. 1, pp. 307-309 (2008).

Che, G., et al., "Carbon nanotubule membranes for electrochemical energy storage and production," Nature 393, pp. 346-349 (1998).

Park, M.-S. et al., "Preparation and electrochemical properties of SnO2 nanowires for application in lithium-ion batteries," Angew. Chem. Int. Edn 46, pp. 750-753 (2007).

Huggins, R. A. & Nix, W. D., "Decrepitation model for capacity loss during cycling of alloys in rechargeable electrochemical systems," Ionics 6, pp. 57-63 (2000).

Lee, Y. M., et al., "SEI layer formation on amorphous Si thin electrode during precycling," J.Electrochem. Soc. 154, pp. A515-A519 (2007).

Green, M., et al., "Structured silicon anodes for lithium battery applications," Electrochem. Solid-State Lett. 6, pp. A75-A79 (2003).

Ryu, J. H., et al., "Failure modes of silicon powder negative electrode in lithium secondary batteries," Electrochem. Solid-State Lett. 7, pp. A306-A309 (2004).

Kasavajjula, et al., "Nano- and bulk-silicon-based insertion anodes for lithium-ion secondary cells," J. Power Sources 163, pp. 1003-1039 (2007).

Gao, et al., "Alloy formation in nanostructured silicon," Adv. Mater. 13, pp. 816-819 (2001).

Wang, Y., et al., "Epitaxial growth of silicon nanowires using an aluminum catalyst," Nature Nanotech. 1, pp. 186-189 (2006).

Wu, Y. et al., "Controlled growth and structures of molecular-scale silicon nanowires," Nano Lett. 4, pp. 433-436 (2004).

Zhou, "Controlled Li Doping of Si Nanowires," Applied Physics Letters, vol. 75, No. 16 (Oct. 18, 1999).

Armstrong et al. "$TiO_2$(B) Nanowires as an Improved Anode Material for Lithium-Ion Batteries Containing $LiFePO_4$ or $LiNi_{0.5}Mn_{1.5}O_4$ Cathodes and a Polymer Electrolyte." Adv. Mater. 18, 2597-2600 (2006).

Boukamp et al. "All-solid lithium electrodes with mixed-conductor matrix." J. Electrochem. Soc. 128, 725-729 (1981).

Chan et al. "High-performance lithium battery anodes using silicon nanowires." Nature Nanotechnology 3, 31-35 (Jan. 2008).

Dick et al. "A new understanding of Au-assisted growth of III-V semiconductor nanowires." Adv. Funct. Mater. 15, 1603-1610 (2005).

Givargizov. "Fundamental Aspects of VLS Growth." Journal of Crystal Growth 31, 20-30 (1975).

Goldstein et al. "Melting in Semiconductor Nanocrystals." Science 256, 1425-1427 (Jun. 1992).

Graetz et al. "Highly-Reversible Lithium Storage in Nanostructured Silicon." Electro. and Solid-State Letters 6(2), A194-A197 (2003).

Hannon et al. "The influence of the surface migration of gold on the growth of silicon nanowires." Nature 440, 69-71 (2006).

Hatchard et al. "In Situ XRD and Electrochemical Study of the Reaction of Lithium with Amorphous Silicon." Journal of the Electro. Chem. Society 151, A838-A842 (2004).

Huang et al. "Catalytic Growth of Zinc Oxide Nanowires by Vapor Transport." Adv. Mater. 13(2), 113-116 (2001).

Levitt. *Whisker Technology*. Wiley Interscience, 1970.

Li et al. "A High Capacity Nano-Si Composite Anode Material for Lithium Rechargeable Batteries." *Electrochemical and Solid-State Letters*, 2 (11) 547-549 (1999).

Li et al. "Rate Capabilities of Nanostructured $LiMn_2O_4$ Electrodes in Aqueous Electrolyte." J. Electrochem. Soc. 147, 2044-2049 (2000).

Li et al. "An in Situ X-Ray Diffraction Study of the Reaction of Li with Crystalline Si." Journal of the Electro. Chem. Society 154, A156-A161 (2007).

Nam et al. "Virus-Enabled Synthesis and Assembly of Nanowires for Lithium Ion Battery Electrodes." Science 312, 88-888 (May 2006).

Nazri et al. *Lithium Batteries: Science and Technology*. Springer, 708 pgs. (2004). Overview only, 1 page.

Netz et al. "The formation and properties of amorphous silicon as negative electrode reactant in lithium systems." Power Sources 119-121, 95-100 (2003).

Obrovac et al. "Reversible Cycling of Crystalline Silicon Powder." Journal of the Electro. Chem. Society 154, A103-A108 (2007).

Pan et al. "Nanobelts of Semiconducting Oxides." Science 291, 1947-1949 (Mar. 2001).

Poizot et al. "Nano-sized transition-metal oxides as negative-electrode materials for lithium-ion batteries." Nature 407, 496-499 (Sep. 2000).

Shaju et al. "Mesoporous and nanowire $Co_3O_4$ as negative electrodes for rechargeable lithium batteries." Phys. Chemistry Chem. Physics 9, 1837-1842 (2007).

Sharma et al. "Thermodynamic Properties of the Lithium-Silicon System." Journal of the Electrochemical Society 123, 1763-1768 (Dec. 1976).

Shodai et al. "Study of $Li_{3-x}M_xN$ (M: Co, Ni or Cu) system for use as anode material in lithium rechargeable cells." Solid State Ionics 86-88(2), 785-789 (Jul. 1996).

Uehara et al. "Thick vacuum deposited silicon films suitable for the anode of Li-ion battery." Journal of Power Sources 146, 441-444 (2005).

Westwater et al. "Growth of silicon nanowires via gold/silane vapor-liquid-solid reaction." Journal Va. Sci. Technology B 15(3). 554-557 (May/Jun. 1997).

Yang et al. "Small-Particle Size Multiphase Li-Alloy Anodes for Lithium-Ion-Batteries." Solid State Ionics 90, 281-287 (1996).

(56) References Cited

OTHER PUBLICATIONS

Yazawa et al. "Effect of one monolayer of surface gold atoms on the epitaxial growth of InAs nanowhiskers." Appl. Phys. Lett. 61(17), 2051-2053 (Oct. 1992).

Sharma et al. "Diameter control of Ti-catalyzed silicon nanowires." Journal of Crystal Growth 267 (2004), pp. 613-618.

Sharma et al. "Structural characteristics and connection mechanism of gold-catalyzed bridging silicon nanowires." Journal of Crystal Growth 280 (2005), pp. 562-568.

Li et al. "Freestanding mesoporous quasi-single-crystalline Co3O4 nanowire arrays." Journal of the American Chemical Society 128(44), Jan. 1, 2006, pp. 14258-14259.

Wagner et al. "Vapor-Liquid-Solid Mechanism of Single Crystal Growth." Applied Physics Letters, vol. 4, No. 5 (Mar. 1, 1964), p. 89-90.

Wagner et al. "The Vapor-Liquid-Solid Mechanism of Crystal Growth and its Application to Silicon." Transactions of the Metallurgical Society of AIME, vol. 233, No. 6 (Jun. 1, 1965), p. 1053-1064.

* cited by examiner

NANOWIRE BATTERY METHODS AND ARRANGEMENTS

RELATED PATENT DOCUMENTS

This patent document is a continuation under 35 U.S.C. §120 of U.S. patent application Ser. No. 11/837,291 filed on Aug. 10, 2007 (U.S. Pat. No. 7,816,031), which is fully incorporated herein by reference.

FIELD OF THE INVENTION

The present invention relates generally to ion battery arrangement and methods, and more particularly to nanowire-based electrode arrangements and approaches involving the assembly or manufacture of nanowire electrode arrangements.

BACKGROUND

The demand for batteries with high energy capacity, low weight and long lifetime has become increasingly important in a variety of fields and industries, including those relating to portable electronic devices, electric vehicles, and implantable medical devices. For example, the energy capacity, weight and cycle life characteristics are often useful for improving the functionality of a particular device in which the batteries are used. In portable electronic devices and implantable medical devices, these and other related aspects are useful to allow for increases in power (e.g., from additional processing power) and/or reduction in the size of the devices. In electric vehicles, these aspects are often limiting factors in the speed, power and operational range of the electric vehicles.

Various commercial embodiments of batteries function as an electrochemical cell that stores and converts chemical energy from chemical oxidation and reduction reactions into a useable electrical form. The chemical reactions occur in the materials composing the two electrodes of the battery, such as reduction occurring in the cathode and oxidation occurring in the anode. These reactions are due in part to a difference in electrochemical potential between the materials comprising the anode and cathode. In many ion-based batteries, the two electrode materials are separated by an ionic conductor, such as an electrolyte, that is otherwise electrically insulating. Each electrode material is electrically connected to an electronically conducting, preferably metallic, material sometimes called the current collector. The current collectors can then be connected to one another using an external circuit that allows for electron transfer therebetween. To equalize the potential difference, the anode releases ions (e.g., by oxidizing to form the ions) when electrons are allowed to flow through the external circuit. The flow of electrons is balanced by the flow of ions through the electrolyte. The ions then react with the chemically reactive material of the cathode. The number of ions that a material can accept is known as the specific capacity of that material. Battery electrode materials are often defined in terms of the energy capacity per weight, for example in mAh/g. Much research has been devoted to creating and developing higher energy density electrode materials for higher capacity batteries.

A specific type of battery is a Lithium-ion battery, or Li-ion battery. Li-ion batteries transport Li ions between electrodes to effect charge and discharge states in the battery. One type of electrode uses graphite as the anode. Graphite anodes have reversible (rechargeable) capacities that are on the order of 372 mAh/g. Graphite anodes function by intercalation of Li ions between the layered-structure. A limitation in some graphitic anodes is that Li is saturated in graphite at the $LiC_6$ stoichiometry. Materials that can allow for larger amounts of Li insertion, therefore, have been attractive for use as high capacity Li battery anodes.

Some alternatives to graphite anodes utilize storage mechanisms that do not involve the intercalation of Li ions between layered-structure materials. For example, some transition metal oxides use a conversion mechanism that can provide relatively high energy anodes of 700 mAh/g. Other alternatives include elements, such as Si, Sn, Bi, and Al, which form alloys with Li through Li insertion. Some of these elements provide relatively large theoretical energy capacities. Often such elements exhibit a volume change during Li insertion. For example, pure Si has a theoretical capacity of 4200 mAh/g for $Li_{4.4}Si$, but has been shown to produce as much as a 400% volume change during Li insertion (alloying). In films and micron-sized particles, such volume changes may cause the Si to pulverize and lose contact with the current collector, resulting in capacity fading and short battery lifetime. Electrodes made of thin amorphous Si may exhibit improvements in capacity stability over many cycles, but such films seldom have enough active material for a viable battery. Attempts to increase conductivity using conducting carbon additives have not completely solved such problems, since upon dealloying (delithiation), the particles may contract, and thereby, lose contact with the carbon. Si anodes have been prepared with a polymer binder such as poly(vinylidene fluoride) (PVDF) to attempt to hold the particles together, but the elasticity properties of PVDF may not be sufficient for the large Si volume change and do not completely mitigate the poor conductivity. This results in a low coulombic efficiency and poor cyclability. For example, the use of 10 μm sized Si particles mixed with carbon black and PVDF has been shown to result in a first discharge capacity of 3260 mAh/g; however, the charge capacity is only 1170 mAh/g, indicating a poor coulombic efficiency of only 35%. After 10 cycles, the capacity also faded to 94%. Moreover, conductive additives and binders add weight to the electrode, lowering the overall gravimetric and volumetric capacities of the battery.

These and other characteristics have been challenging to the design, manufacture and use of Li-alloy materials in Li-battery anodes. A solution has been to use nanostructure battery electrode materials. Nanomaterials include nanowires, nanoparticles, and nanotubes, all of which have at least one dimension in the nanometer dimension. Nanomaterials have been of interest for use in Li batteries because they have better accommodation of strain, higher interfacial contact area with the electrolyte, and short path lengths for electron transport. These characteristics may lead to improved cyclability, higher power rates, and improved capacity. Current efforts, however, leave room for improvement.

SUMMARY OF THE INVENTION

The present invention is directed to overcoming the above-mentioned challenges and others related to the types of applications discussed above and in other applications. These and other aspects of the present invention are exemplified in a number of illustrated implementations and applications, some of which are shown in the figures and characterized in the claims section that follows.

According to one example embodiment, an apparatus is provided for use in a battery. The apparatus provides high energy capacity through the novel use of nanowires that alloy with the ions. A specific example of the apparatus employs nanowires constructed from materials other than carbon to alloy with Li+ ions during a charge state of the battery and to release the Li+ ions during a discharge state. Careful growth of the nanowires directly from the substrate, which is connected to the current collector, can provide an apparatus having nanowires that are substantially all directly connected to the substrate and that extend therefrom.

According to another embodiment, an apparatus is provided for use in a battery in which ions are moved. The apparatus comprises a substrate and a plurality of nanowires, each being growth-rooted from the substrate and each having an outer surface with molecules that interact with the ions.

According to another embodiment of the invention, a battery is provided that has a stable energy capacity. The battery comprises an ion transporter to provide ions; a first current collector on one side of the ion transporter; and a second current collector, located on another side of the ion transporter. The second current collector includes a substrate and a plurality of solid nanowires that are growth-rooted from the substrate and that interact with the ions to set the stable energy capacity greater than about 2000 mAh/g.

According to another embodiment of the invention, a battery that is recharged is provided. The battery comprises an ion transporter to provide ions, a first current collector on one side of the ion transporter and a second current collector that is located on another side of the ion transporter and that includes a substrate and a plurality of solid nanowires. The solid nanowires are growth-rooted from the substrate and interact with the ions to set a maximum capacitive fading between subsequent energy charges at less than about 25 percent.

According to another embodiment of the invention, a battery is provided that has an energy capacity. The battery comprises a first current collector having a substrate, a second current collector, an ion transporter located between the first and second current collectors, the ion transporter providing ions, and a layer of nanowires. The layer of nanowires has a layer height equal to the length of about one of the nanowires. The layer of nanowires also includes nanowires that extend from the substrate toward the ion transporter to combine with ions from the ion transporter and that set the energy capacity for the battery.

According to another embodiment of the invention, a battery is provided. The battery comprises a first current collector, a second current collector, an ion transporter located between the first and second current collectors and one of the collectors including a substrate, and solid nanowires to combine with ions provided by the ion transporter for defining the nominal energy capacity. A preponderance of the solid nanowires are located on the substrate and have an end located on the substrate.

According to another embodiment of the invention, a method of an electrode arrangement that has a substrate for connecting to a current collector is implemented. The electrode arrangement is designed for use in a battery. The method comprises the step of growing solid nanowires from the substrate.

According to another embodiment of the invention, a method is implemented for assembling an electrode arrangement for use in a battery. The method comprises attaching a substrate with growth-rooted solid nanowires to a current collector, forming a current collector assembly with an ion transporter located between the substrate and current collector and another current collector; and placing the current collector assembly within a housing.

The above summary is not intended to describe each illustrated embodiment or every implementation of the present invention.

BRIEF DESCRIPTION OF THE DRAWINGS

The invention may be more completely understood in consideration of the detailed description of various embodiments of the invention that follows in connection with the accompanying drawings, in which.

Figure 1:
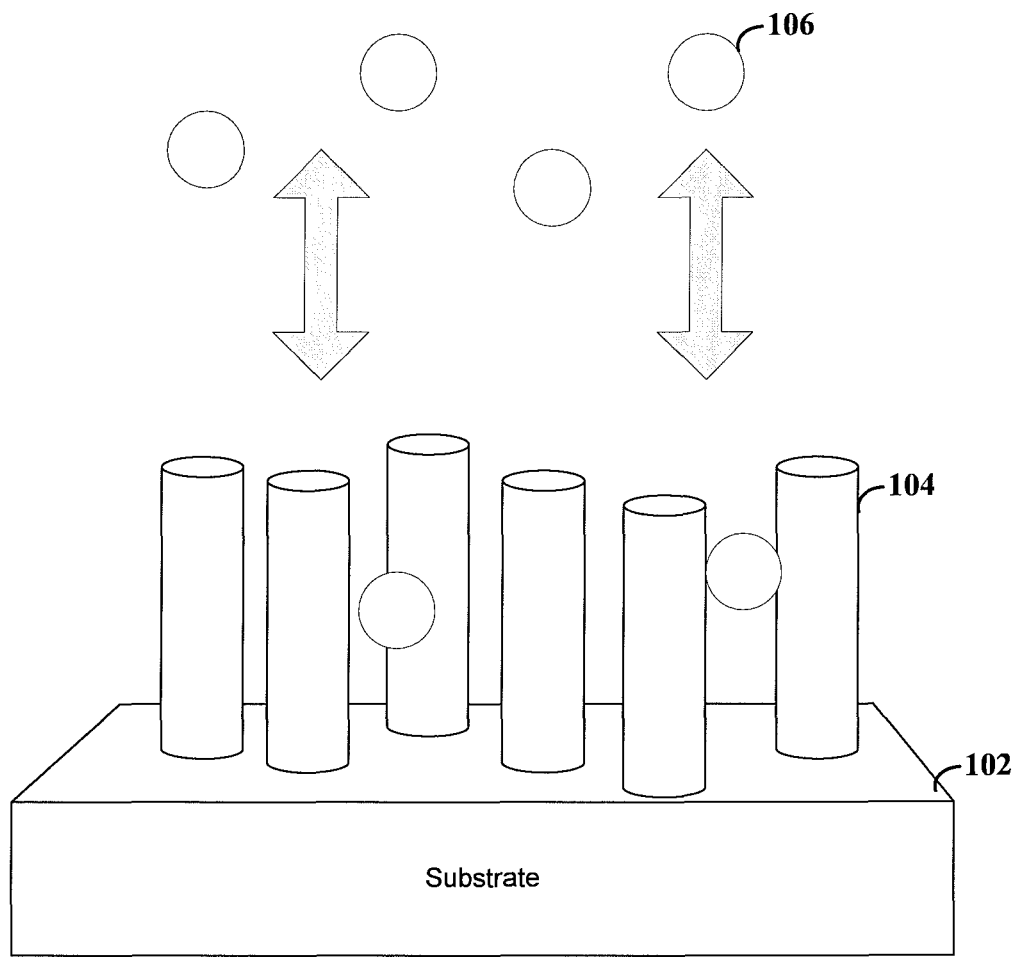
FIG. 1 shows an apparatus for use in a battery in which ions are moved, according to one embodiment of the present invention.

While the invention is amenable to various modifications and alternative forms, examples thereof have been shown by way of example in the drawings and will be described in detail. It should be understood, however, that the intention is not to limit the invention to the particular embodiments shown and/or described. On the contrary, the intention is to cover all modifications, equivalents, and alternatives falling within the spirit and scope of the invention.

DETAILED DESCRIPTION

The present invention is believed to be applicable to a variety of different types of ion batteries and devices and arrangements involving nanowire electrodes. While the present invention is not necessarily so limited, various aspects of the invention may be appreciated through a discussion of examples using this context.

Consistent with one embodiment of the present invention, a battery is implemented with an anode, a cathode, current collectors contacting the anode and cathode, and an electrolyte. The negative electrode or anode is composed of a plurality of nanowires extending from a substrate. The nanowires have an outer surface with multiple molecules that interact with the ions. The substrate from which the nanowires extend is attached to a current collector. The material comprising the current collector can include, but is not limited to, stainless steel, copper, nickel, aluminum, and other preferably metallic materials that are inert to Li. The current collector can also be comprised of a flexible material such as plastic that is coated with a layer of metal, such as copper or nickel, in order to make it electronically conducting. In a specific embodiment, the nanowires are grown from the substrate in such a manner so as to produce nanowires with one end of the nanowire in direct contact with the substrate and the other end of the nanowire extending away from the substrate.

In connection with another embodiment of the present invention, an arrangement for use in a battery is implemented. The arrangement includes solid nanowires that are growth rooted from a substrate. The substrate is attached to a current collector. In this fashion, the arrangement can be used as an electrode in the battery.

In connection with another embodiment of the present invention, a battery is implemented with a stable energy capacity. An ion transporter, such as an electrolyte, allows ions to move between electrodes located on either side of the ion transporter. One of the electrodes has a substrate. A plurality of nanowires is growth-rooted from the substrate. These nanowires interact with the ions to set the stable energy capacity greater than about 2000 mAh/g. Thus, the battery maintains the energy capacity through several charge and discharge cycles. These nanowires are non-fullerene type nanowires that allow for the diffusion of the ions into the nanowire.

In connection with another embodiment of the present invention, a battery is implemented with using nanowires extending from a substrate, where the nanowires provide a stable energy capacity that can be less than 2000 mAh/g.

In a specific instance, the diffusion of ions into the nanowire results in the nanowire temporarily being composed of an alloy of the diffused ions and the underlying nanowire material. A specific example of such an alloy is $Li_{4.4}Si$ formed from the diffusion of Li ions into Si nanowires. Other examples of potential nanowire materials include Ge and Sn as well as various metal oxides, nitrides, and phosphides, such as $SnO_2$, $TiO_2$, $Co_3O_4$, $Li_{2.6}Co_{0.4}N$, $Li_3N$, LiMnN, $FeP_2$, CuP, $CoP_3$ and $MnP_4$. Additionally, the nanowires may be constructed to contain an alloy of these materials with another material, for example a Si—Ge alloy or a Si—Sn alloy.

Consistent with another embodiment of the present invention, a method of producing a battery arrangement is implemented. Nanowires are grown directly on a current collector substrate thereby making direct electronic contact between the nanowires and the current collector. A few methods by which this can be done include using vapor-liquid-solid (VLS) or vapor-solid (VS) growth methods.

In a specific example, Si nanowires are synthesized using $SiH_4$ decomposition. The substrate for the growth may be a suitable conductor, such as a metallic material, or more particularly, a stainless steel 304 foil. Catalysts, such as gold, are deposited on the current collector substrate provided either from colloid solution or by depositing a thin film of Au using e-beam evaporation or sputtering. Alternatively, nanowires can be grown on a substrate using template-free solution phase methods, including but not limited to solution-liquid-solid (SLS) growth, solvothermal, hydrothermal, sol-gel, and supercritical fluid-liquid-solid (SFLS).

The resulting nanowires may exhibit diameters that range in size and that are specifically tailored to an application. Careful selection of the diameter can be accomplished by balancing a number of factors. For example, nanowires having suitable small diameters may be less susceptible to dissociation from the substrate due to ion-insertion (or deinsertion) strain. Such strain may result in dissociation of the nanowires from the current collector (e.g., due to pulverization of the material), resulting in a reduction of the energy capacity. Larger diameters may increase the total volume of nanowire material on the substrate; however, larger diameters may result in the ions not fully diffusing into the center of the nanowire. Such failure to fully diffuse may result in a corresponding decrease in the energy capacity per gram of the nanowires because a portion of the nanowire has not been used. These and other factors may be used to determine the optimal nanowire size.

Some of the various nanowire arrangements and methods discussed herein may be particularly useful for providing nanowires that are substantially all directly connected with the metallic current collector. Such connected nanowires contribute directly to the capacity without the use of intervening conductive material. These connected nanowires may also be constructed so as to withstand volumetric changes exhibited during the cycling of the battery. Thus, some arrangements and growth methods may be useful for avoiding the use of binders or conducting additives, which can add extra weight and lower the overall capacity of the battery. Moreover, some nanowires allow for direct (1 dimensional) electron pathways along the length of the wire to the current collector. This may be particularly useful for efficient charge transport to the current collector. In one instance, this electrode is used as the anode, or negative electrode, of the battery.

In a particular embodiment of the present invention, the positive electrode, or cathode, may contain an electrode that is similar to the anode in that it has a plurality of nanowires extending from a current collector substrate. These nanowires can be grown using the vapor phase and template-free solution phase methods previously mentioned. Alternatively, the cathode may be composed of powder composite materials that are presently used in a Li-ion battery. While the present invention is not limited to such examples, a few examples of commercially available cathode materials are $LiCoO_2$, $LiFePO_4$, $LiMnO_2$, $LiMn_2O_4$, and $LiNiO_2$. Between the two electrodes is an ionically conducting, electronically insulating region that includes an electrolyte facilitating transport, of ions between the electrodes. This region includes a membrane separator soaked with electrolyte, the electrolyte being a Li salt dissolved in an organic solvent, for example, 1 M $LiPF_6$ in 1:1 w/w ethylene carbonate: diethyl carbonate. Alternatively, the electrolyte can be a Li salt mixed with a solid ionically conducting material such as a polymer or inorganic material.

According to various example embodiments of the present invention, a nanowire apparatus provides a stable energy capacity greater than about 2000 mAh/g. In a particular instance, the nanowires grown from the substrate initially exhibit a crystalline structure. After a first charge and a first discharge cycle, a portion (or all) of the nanowires can be transformed into an amorphous state. This is believed to be due to the insertion of the ions into the molecular structure of the nanowires, thereby disrupting the crystalline structure of the nanowires. A charge cycle may also result in an increase in the size of the nanowires. For instance, crystalline structures formed from Si have been shown to exhibit a 400% increase in size after the formation of a Si—Li alloy. The growth of sufficiently small nanowires may be particularly useful for adequate strain relaxation and better accommodation of large volume changes without fracturing. The nanowires can also be grown so as to have relatively short ion (e.g., Li) diffusion pathways. In some instances, a 1-dimensional electron pathway is exploited by growing the nanowires directly on the current collector substrate, thereby electrically addressing each nanowire and allowing for continuous electron transport pathways down the length of each nanowire.

Turning now to the figures, FIG. 1 shows an apparatus for use in a battery in which ions are moved, according to one embodiment of the present invention. Nanowires 104 extend from substrate 102 and are adapted to interact with ions 106 during charging and discharging of the battery.

In one instance, nanowires 104 are non-fullerene nanowires growth rooted from substrate 102. Rather than using intercalation into a layered material, such as single-walled nanotubes (SWNT) and multi-walled nanotubes (MWNT) made from carbon, the non-fullerene nanowires use an alloying mechanism to interact with the ions. This can be particularly useful for providing a high-energy-capacity battery.

The nanowires 104 can be constructed from various materials that interact appropriately with the ions 106 (e.g., store ions during charge and release ions during discharge).

Figure 2:
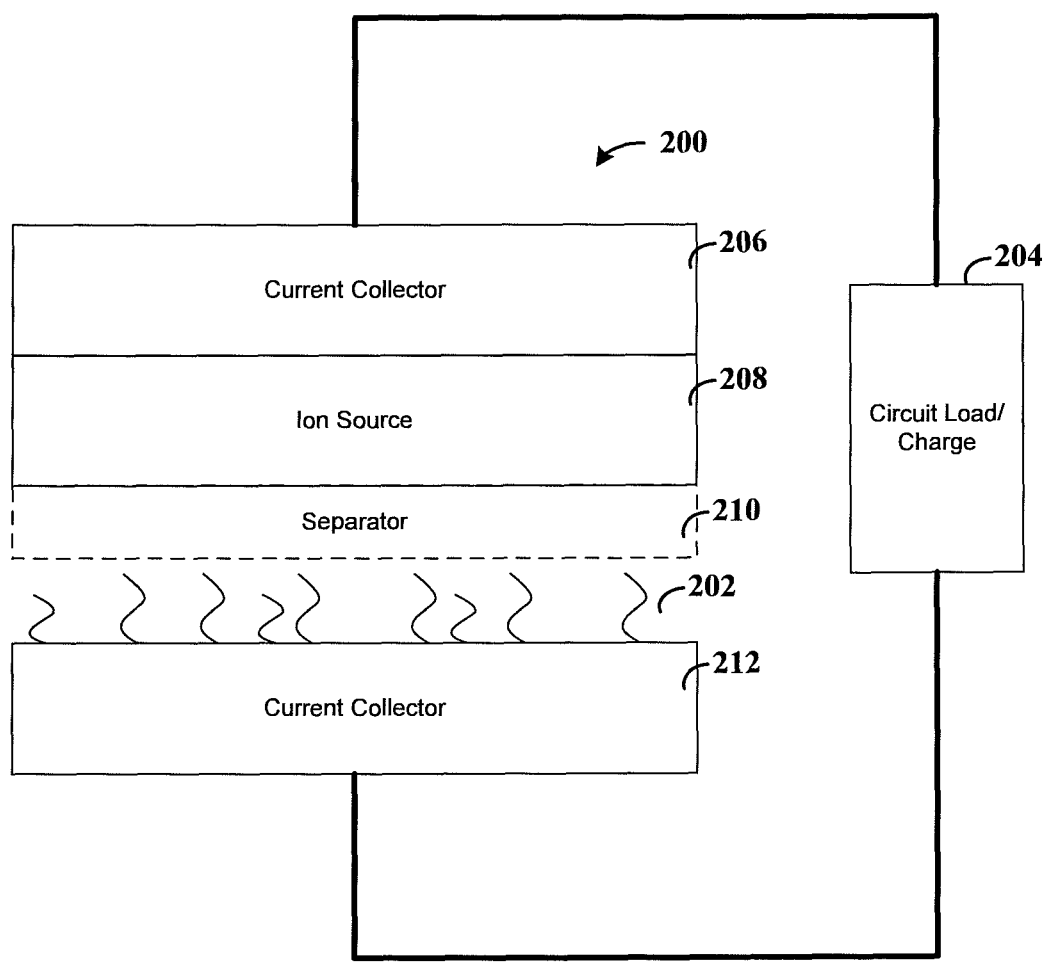
FIG. 2 shows a battery cell having nanowires, according to an embodiment of the present invention.

FIG. 2 shows a battery cell having nanowires, according to an embodiment of the present invention. Battery 200 is connected to load/charge circuit 204. When operating in discharge mode, battery 200 provides current to circuit 204.

When operating in charge mode, current from circuit 204 is used to charge battery 200. Current collectors 206 and 212 are conductors that make electronic contact to the anode and cathode. In a specific embodiment the current collectors are metal and unreactive to Li.

Nanowires 202 are connected to the current collector 212. In a specific embodiment, current collector 212 is part of the anode of battery 200. The nanowires interact with ions from ion source 208. Ion source 208 may include a material that contains Lithium, such as $LiCoO_2$. Separator 210 may be optionally implemented to maintain physical separation between the ion source 208 and the nanowires 202 while allowing ions from ion source 208 to pass. This may be accomplished by the use of various porous materials. In another instance, ion source 208 can include a solid source of ions, such as a Li foil. In yet another instance, ion source 208 can include nanowires composed of a cathode material connected to current collector 206.

According to one embodiment of the present invention, the current collectors are arranged as parallel sheets separated by the ion source.

In other embodiments the current collectors can be arranged in various orientations. For instance, the current collectors may be arranged in a concentric, cylindrical fashion. This can be particularly useful for creating batteries that have a similar form factor to current battery technologies, such as C, AA, AAA cell-sized batteries. In another instance, a plurality of battery cells, each having respective anode, cathode and ion sources, may be arranged in series and/or parallel configuration to form a single battery with the desired capacity and voltage characteristics.

Figure 3:
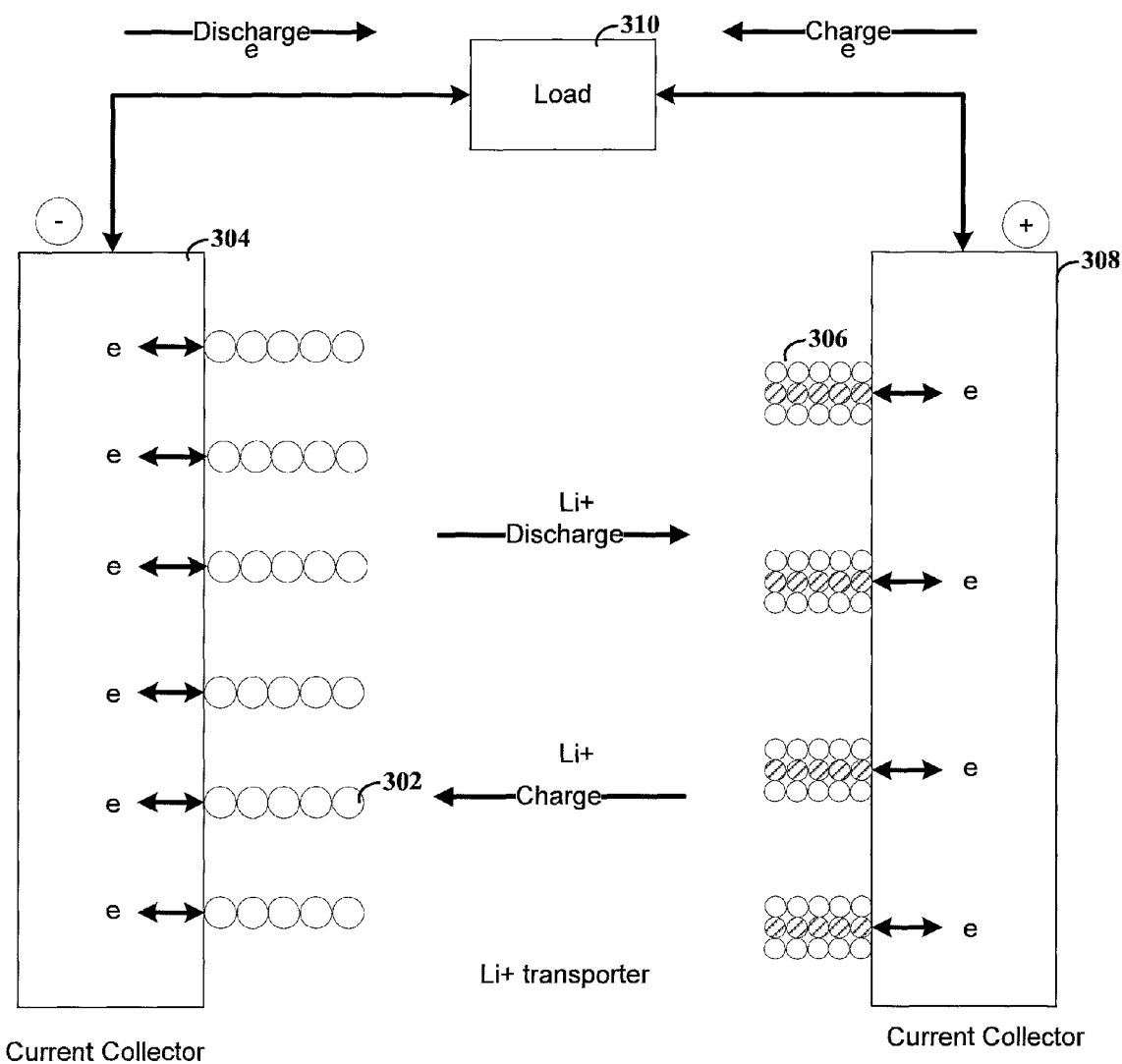
FIG. 3 shows the functionality of a lithium-ion battery cell having nanowires on the current collector anode, according to an example embodiment of the present invention.

FIG. 3 shows the functionality of a lithium-ion battery cell having nanowires on the current collector anode, according to an example embodiment of the present invention. Current collectors 304 and 308 provide an interface from the load 310 to both the anodal nanowires 302 and the cathode portions 306. In a particular embodiment, cathode portions 306 can be constructed from nanostructures; the invention, however, is not limited to such an embodiment. The anodal nanowires 302 receive and accept with $Li^+$ ions during a charge state, for example by alloying. Such a charge state is implemented by application of an appropriate voltage to current collectors 304 and 308. Energy from the applied voltage is stored, for example, in the form of a nanowire-Li alloy. Cathode portions 306 release $Li^+$ ions during the charge state. In a specific example, the cathode is a metal oxide (e.g., $LiCoO_2$) that changes its oxidation charge during the charge state. For instance, in the case of $LiCoO_2$, the charge state is a higher oxidation state than the discharge state, where $Co^{3+}$ oxidizes to $Co^{4+}$ releasing a $Li^+$ ion to the electrolyte. Thus, more ions are free to react with the anodal nanowires during the charge state.

As shown in FIG. 3, the Li+ ions can be part of an electrolyte that is located in the area between the anode and cathode. This allows the Li+ ions freedom to move between the anode and cathode during either of the charge and discharge states. In one instance, a porous separator layer is used to provide structural support between the anode and cathode, while still allowing for the movement of Li+ ions therebetween. Specific embodiments of the present invention implement battery using an electrolyte that has Li salt dissolved in an organic solvent. A specific example is 1.0 M $LiPF_6$ in 1:1 w/w ethylene carbonate: diethyl carbonate. The electrolyte can also be a Li salt dissolved with a polymer or inorganic material.

The structure of FIG. 3 can be assembled by forming an electrode arrangement that has an ion transporter located between the current collectors of the anode and cathode. One of the anode and cathode includes a substrate that has solid nanowires grown therefrom. This structure can then be surrounded by a suitable housing, such as an insulating material with at least two conductive terminals. One terminal is used to electrically connect to the anode portion of the structure, while another terminal is electrically connected to the cathode portion of the structure. In a specific embodiment, the structure can be shaped to conform to form factors of commercially available batteries.

Figure 4A:
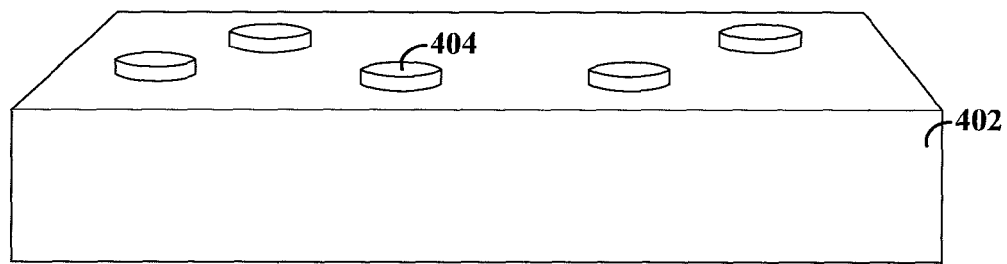
FIGS. 4A, 4B and 4C show various stages in producing a structure for use in an ion-battery, according to an example embodiment of the present invention.
Figure 4B:
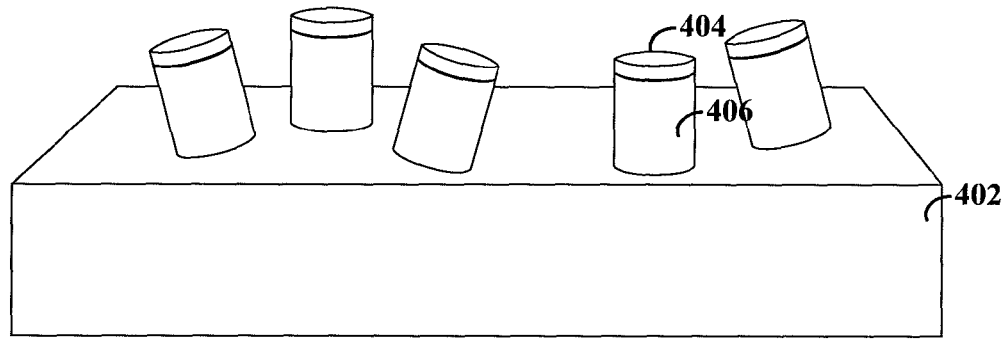
Figure 4C:
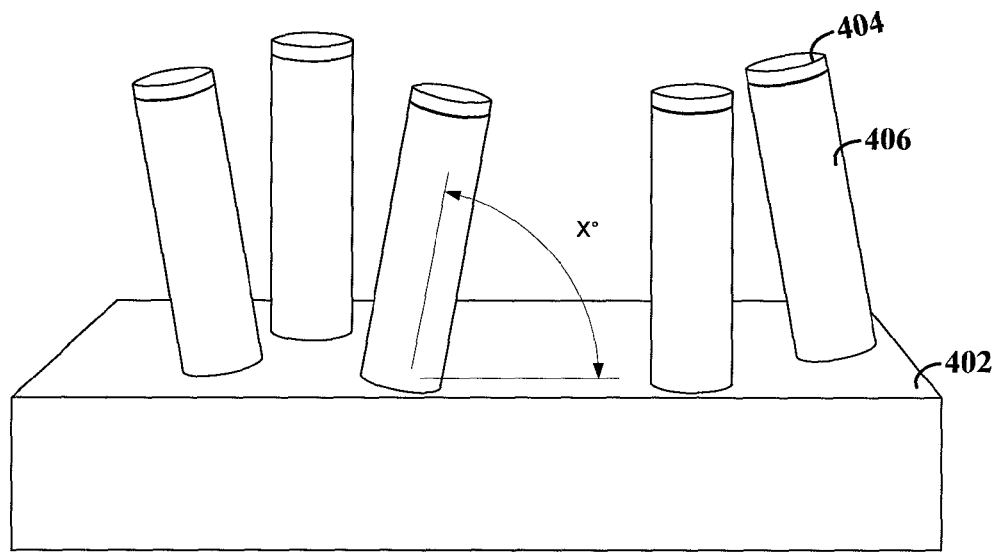

FIGS. 4A-4C show various stages in producing a structure for use as a nanowire electrode in an ion-battery by using a vapor-liquid-solid growth (VLS), according to an example embodiment of the present invention. In FIG. 4A, catalysts 404 are deposited directly onto substrate 402. Substrate 402 is made from a suitable conductor, such as a metallic material, or more particularly, a stainless steel foil. Other examples of suitable conductors include copper, nickel, aluminum, or a flexible material such as plastic coated with a metal. Catalysts 404, such as gold, are provided either from colloid solution or by depositing a thin film of Au using e-beam evaporation or sputtering. Other suitable catalysts are determined by the particular nanowire material system of interest. Alternatively, no catalyst may be needed when using a template-free solution phase method to grow nanowires directly on the current collector surface.

FIG. 4B shows the growth of nanowires 406 on the substrate 402. Vapor-liquid-solid (VLS) or vapor-solid (VS) growth methods are then used to produce nanowires that are connected to the substrate and that extend therefrom. Examples of such techniques are described in more detail in A. M. Morales, and C. M. Lieber, *Science* 279, 208 (1998); M. H. Huang, et al. *Adv. Mater.* 13, 113-116 (2001); Dick, K. A. et al. *Adv. Funct. Mater.* 15, 1603-1610 (2005); Pan, Z. W., et. al. *Science* 291, 1947-1949 (2001), each of which are fully incorporated herein by reference. In a specific example, Si nanowires are synthesized using $SiH_4$ decomposition.

FIG. 4C shows the completion of the growth of nanowires 406 from substrate 402. In a specific embodiment the nanowires are on the order of tens of microns in length and between 50 nm and 300 nm in diameter prior to a charge-discharge stage. Due to the process of growth, a majority of the nanowires may exhibit a substantially vertical growth from substrate. This may be characterized in a specific example where the majority of the nanowires have an angle greater than about 50 degrees from the substrate as shown by angle X.

According to a specific embodiment of the invention, Si nanowires (SiNWs) are grown from the substrate using an Au catalyst. Single-crystalline SiNWs are grown inside a tube furnace using the vapor-liquid-solid growth method. Stainless steel 304 (0.002" thick) foil substrates are decorated with Au catalysts, either by functionalizing with 0.1% w/v aqueous poly-L-lysine solution and dipping into 50 nm diameter Au colloid solution, or by evaporating 75 nm Au using e-beam evaporation and annealing for 30 min at 530° C. just prior to growth. The substrates were heated to 530° C. and silane ($SiH_4$, 2% in Ar) was flowed in at 80 sccm with a total chamber pressure of 30 Torr.

In this example, the electrochemical properties of the SiNW electrode were evaluated using cyclic voltammetry. The charging current associated with the formation of the lithium-silicide compounds $Li_{12}Si_7$ starts at ~330 mV and shows a peak at 25 mV, corresponding to the formation of $Li_{21}Si_5$. The charging peaks at 370 and 620 mV represent the delithiation, which is consistent with previous studies done on microstructured silicon anodes. These characteristic current peaks increase with cycling because the scan rate is fast and more SiNWs are activated with cycling. The Au catalyst was also electrochemically active, with lithiation beginning at ~150 mV. The delithiation peak was visible at ~180 mV in the SiNW sample. Both cyclic voltammetry and constant current measurements on a control sample with a 75 nm Au film on stainless steel showed that the current associated with Au alloying and dealloying with Li are low compared to that for the SiNWs, with an initial discharge capacity of 20 mAh/g that decayed to <10 mAh/g after 10 cycles. Thus, the capacity contribution from Au may be considered negligible in the SiNW electrodes. In other embodiments the catalyst may be removed to avoid any such contribution.

FIGS. 5A-5D show results obtained from an experimental implementation a half-cell that was constructed with a plurality of Si nanowires (SiNWs) grown on a stainless steel substrate as one electrode and lithium foil as the other electrode, according to one example embodiment of the present invention. The electrochemical properties were performed in a glass cell with 1.0 M LiPF6 electrolyte in 1:1 w/w ethylene carbonate: diethyl carbonate as solvent. Li insertion into the SiNWs was found to exhibit a relatively high energy capacity.

Figure 5B:
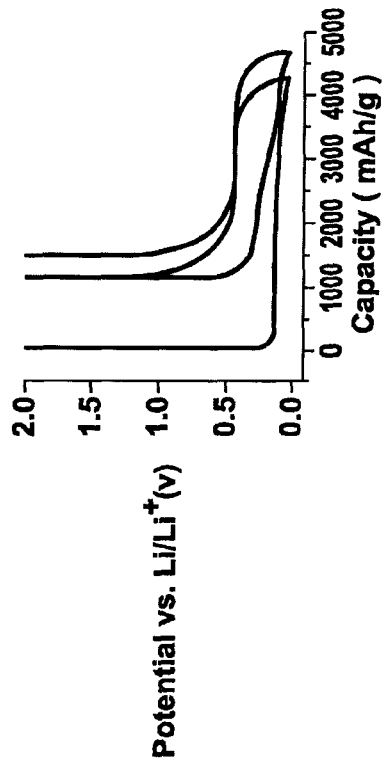
FIGS. 5A, 5B, 5C and 5D show results of an experimental battery arrangement; according to an example embodiment of the present invention.
Figure 5D:
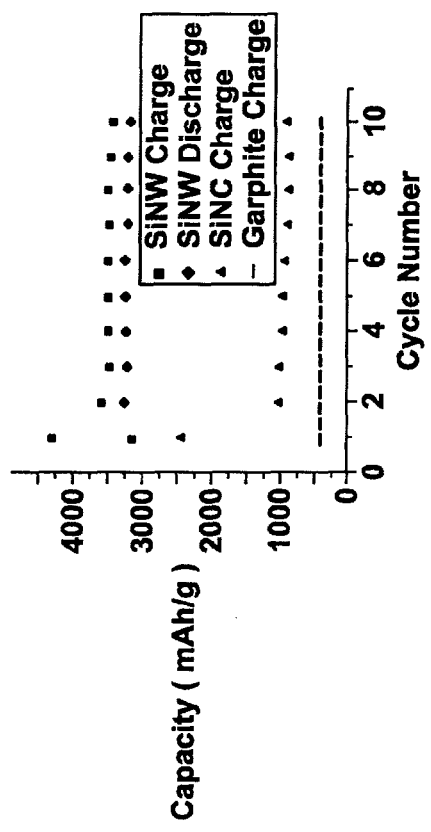
Figure 5A:
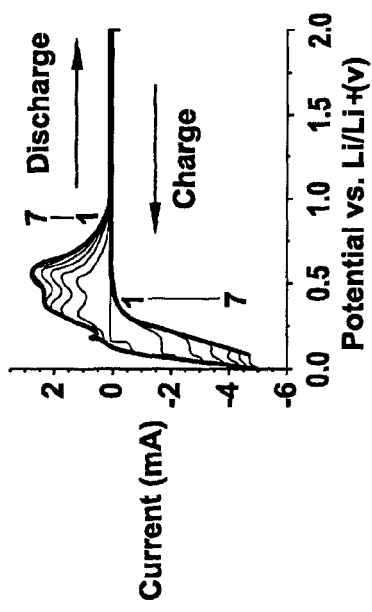
Figure 5C:
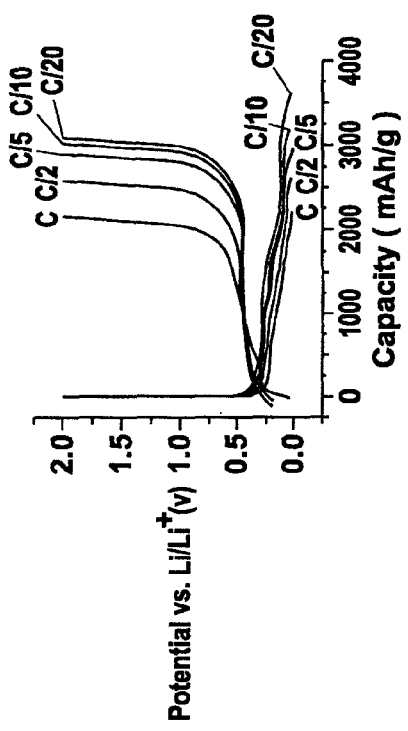

FIG. 5A shows a cyclic voltammogram measured over the range from 2.0 to 0.01 V vs. Li/Li$^+$ with a scan rate of 1 mV/s. The charge current associated with the formation of the Li—Si alloy started at ~330 mV and became quite large below 100 mV. Upon discharge, current peaks appeared at about 370 and 620 mV. FIG. 5B shows results of the first and second cycles at the C/20 rate. The voltage profile observed was consistent with previous studies on Si anodes, with a long flat plateau during the first charge, during which amorphous LixSi is being formed from crystalline Si. Subsequent discharge and charge cycles have different voltage profiles, characteristic of amorphous silicon. The observed capacity during this first charging operation was 4277 mAh/g, which is essentially equivalent (i.e., within experimental error) to the theoretical capacity. The first discharge capacity was 3124 mAh/g, indicating a coulombic efficiency of 73%. The second charge capacity decreased by 17% to 3541 mAh/g although the second discharge capacity increased slightly to 3193 mAh/g, giving a coulombic efficiency of 90%. FIG. 5D shows that both charge and discharge capacities remained nearly constant for subsequent cycles with little fading up to 10 cycles. FIG. 5D also shows charge and discharge data along with the theoretical capacity (372 mAh/g) for lithiated graphite currently used in lithium battery anodes, and the charge data for thin films containing 12 nm Si nanocrystals (NCs). The SiNWs displayed high capacities at higher currents as well. FIG. 5C shows the charge and discharge curves observed at C/10, C/5, C/2, and 1C rates. Even at the 1C rate, the capacities remained >2100 mAh/g.

While the present invention has been described above and in the claims that follow, those skilled in the art will recognize that many changes may be made thereto without departing from the spirit and scope of the present invention. Such changes may include, for example, the use of a number of different alloy combinations for the nanowires. In addition, the batteries may be constructed using a plurality of cells, each containing a current collector with nanowires for interacting with the ions. These and other approaches as described in the contemplated claims below characterize aspects of the present invention.

What is claimed is:

1. A battery electrode apparatus, comprising:
a metallic substrate; and
a plurality of solid nanowires that are rooted from and extend away from the metallic substrate, wherein the solid nanowires consist essentially of silicon, tin, germanium, or an alloy thereof, and wherein the solid nanowires are directly connected to the metallic substrate, therein providing a stable energy capacity of greater than 1000 mAh/g.

2. The battery electrode apparatus of claim 1, wherein the plurality of solid nanowires are: configured with the free ends in liquid electrolyte that contacts sidewalls of the plurality of solid nanowires to centers of the plurality of solid nanowires, and configured to facilitate transport of electrochemically active ions from the liquid electrolyte.

3. The battery electrode of claim 1, wherein the plurality of solid nanowires have an average outer diameter in a range from 10 to 100 nanometers.

4. The battery electrode of claim 1, wherein the plurality of solid nanowires have an average outer diameter in a range from 50 to 300 nanometers.

5. The battery electrode of claim 1, wherein the stable energy capacity is achieved at a cycling rate of at least about C/2.

6. The battery electrode of claim 1, wherein a majority of the plurality of nanowires are non-parallel to each other and are oriented substantially vertically with respect to the substrate.

7. A battery electrode apparatus, comprising:
a metallic substrate; and
a plurality of solid nanowires that are growth-rooted from and extend away from the metallic substrate and terminate with free ends, wherein the plurality of solid nanowires consist essentially of essentially of silicon, tin, germanium, or an alloy thereof and are constructed to resist fracturing during volumetric changes exhibited during battery cycling, therein providing a stable energy capacity of greater than 1000 mAh/g.

8. The battery electrode apparatus of claim 7, wherein the plurality of solid nanowires are: configured with the free ends in liquid electrolyte that contacts sidewalls of the plurality of solid nanowires to centers of the plurality of solid nanowires, and configured to facilitate transport of electrochemically active ions from the liquid electrolyte.

9. The battery electrode of claim 7, wherein the plurality of solid nanowires have an average outer diameter in a range from 10 to 100 nanometers.

10. The battery electrode of claim 7, wherein the plurality of solid nanowires have an average outer diameter in a range from 50 to 300 nanometers.

11. The battery electrode of claim 7, wherein the stable energy capacity is achieved at a cycling rate of at least about C/2.

12. The battery electrode of claim 7, wherein a majority of the plurality of nanowires are non-parallel to each other and are oriented substantially vertically with respect to the substrate.

13. A battery electrode, comprising:
a metallic substrate; and
a plurality of solid nanowires that are growth-rooted from the metallic substrate, wherein the plurality of solid nanowires includes silicon, tin, germanium, or an alloy thereof and are constructed to resist fracturing during volumetric changes exhibited during battery cycling, and wherein the plurality of solid nanowires has a stable energy capacity of greater than about 2000 mAh/g when cycled with lithium ions.

14. The battery electrode of claim 13, wherein the plurality of solid nanowires comprises silicon and/or silicon alloy.

15. The battery electrode of claim 13, wherein the plurality of solid nanowires have an average outer diameter in a range from 10 to 100 nanometers.

16. The battery electrode of claim 13, wherein the plurality of solid nanowires have an average outer diameter in a range from 50 to 300 nanometers.

17. The battery electrode of claim 13, wherein the solid nanowires comprise crystalline structures.

18. The battery electrode of claim 13, wherein the solid nanowires comprise an amorphous material.

19. The battery electrode of claim 13, wherein the stable energy capacity is achieved at a cycling rate of at least about C/2.

20. The battery electrode of claim 13, wherein the metallic substrate comprises one or more materials selected from the group consisting of stainless steel, copper, and nickel.

21. The battery electrode of claim 13, wherein the metallic substrate comprises at least some catalyst.

22. The battery electrode of claim 13, wherein the solid nanowires are grown from a plurality of catalyst particles deposited on the substrate at a plurality of locations, and wherein the solid nanowires are growth rooted at the plurality of locations.

23. The battery electrode of claim 13, wherein the solid nanowires are directly connected to the metallic substrate.

24. The battery electrode of claim 13, wherein a majority of the plurality of nanowires are non-parallel to each other and are oriented substantially vertically with respect to the substrate.

25. A battery electrode, comprising:
a metallic substrate; and
a plurality of solid nanowires that are rooted from the metallic substrate, wherein the solid nanowires include silicon, tin, germanium, or an alloy thereof, and wherein the solid nanowires are directly connected to the metallic substrate and have a stable energy capacity of greater than about 2000 mAh/g when cycled with lithium ions.

26. The battery electrode of claim 25, wherein the solid nanowires comprise silicon and/or silicon alloy.

27. The battery electrode of claim 25, wherein the plurality of solid nanowires have an average outer diameter in a range from 10 to 100 nanometers.

28. The battery electrode of claim 25, wherein the plurality of solid nanowires have an average outer diameter in a range from 50 to 300 nanometers.

29. The battery electrode of claim 25, wherein the solid nanowires comprise crystalline structures.

30. The battery electrode of claim 25, wherein the solid nanowires comprise an amorphous material.

31. The battery electrode of claim 25, wherein the stable energy capacity is achieved at a cycling rate of at least about C/2.

32. The battery electrode of claim 25, wherein the metallic substrate comprises one or more materials selected from the group consisting of stainless steel, copper, and nickel.

33. The battery electrode of claim 25, wherein the plurality of solid nanowires are constructed to resist fracturing during volumetric changes exhibited during battery cycling.

34. The battery electrode of claim 25, wherein a majority of the plurality of nanowires are non-parallel to each other and are oriented substantially vertically with respect to the substrate.

35. A battery, comprising:
a separator containing a liquid electrolyte to transport electrochemically active ions;
a first electrode on one side of the separator; and
a second electrode, located on another side of the separator, including a metallic substrate and a plurality of solid nanowires that are growth-rooted from the metallic substrate and terminate with free ends in the liquid electrolyte, wherein the plurality of solid nanowires consist essentially of silicon, tin, germanium, or an alloy thereof, the plurality of solid nanowires therein providing a stable energy capacity of greater than 1000 mAh/g.

36. The battery of claim 35, wherein the plurality of solid nanowires have an average outer diameter in a range from 10 to 100 nanometers.

37. The battery of claim 35, wherein the plurality of solid nanowires have an average outer diameter in a range from 50 to 300 nanometers.

38. The battery of claim 35, wherein the stable energy capacity is achieved at a cycling rate of at least about C/2.

39. The battery of claim 35, wherein a majority of the plurality of nanowires are non-parallel to each other and are oriented substantially vertically with respect to the substrate.

40. A battery, comprising:
a separator containing a liquid electrolyte to transport electrochemically active ions;
a first electrode on one side of the separator; and
a second electrode, located on another side of the separator, including a metallic substrate and a plurality of solid nanowires that are growth-rooted from the metallic substrate, wherein the plurality of solid nanowires includes silicon, tin, germanium, or an alloy thereof, and has a stable energy capacity of greater than about 2000 mAh/g when cycled with lithium ions.

41. The battery of claim 40, wherein the plurality of solid nanowires have an average outer diameter in a range from 50 to 300 nanometers.

42. The battery of claim 40, wherein the plurality of solid nanowires have an average outer diameter in a range from 10 to 100 nanometers.

43. The battery of claim 40, wherein, in a discharge state, the plurality of solid nanowires comprises silicon or an alloy thereof.

44. The battery of claim 40, wherein the second electrode is a negative electrode.

45. The battery of claim 40, wherein the metallic substrate comprises one or more materials selected from the group consisting of stainless steel, copper, and nickel.

46. The battery of claim 40, wherein the first electrode and the second electrode are arranged in a concentric cylindrical fashion.

47. The battery of claim 40, wherein the substrate comprises at least some catalyst.

48. The battery of claim 40, wherein the solid nanowires are grown from a plurality of catalyst particles deposited on the substrate at a plurality of locations, and wherein the solid nanowires are growth rooted at the plurality of locations.

49. The battery of claim 40, wherein the solid nanowires are directly connected to the metallic substrate.

50. The battery of claim 40, wherein the liquid electrolyte comprises a lithium salt dissolved in an organic solvent.

51. The battery of claim 50, wherein the organic solvent comprises one or more solvents selected from the group consisting of ethylene carbonate and diethyl carbonate.

52. The battery of claim 40, wherein the plurality of solid nanowires are configured to facilitate transport of the electrochemically active ions from the liquid electrolyte that contacts sidewalls of the plurality of solid nanowires to centers of the plurality of solid nanowires.

53. The battery of claim 40, wherein the separator is a porous material soaked with the liquid electrolyte.

54. The battery of claim 1, wherein a majority of the plurality of nanowires are non-parallel to each other and are oriented substantially vertically with respect to the substrate.

* * * * *